3,446,628
CONGEALED CONFECTIONS
Thomas J. Schoch and Donald F. Stella, La Grange, and Howard J. Wolfmeyer, Arlington Heights, Ill., assignors to Corn Products Company, New York, N.Y., a corporation of Delaware
No Drawing. Filed Nov. 15, 1965, Ser. No. 507,707
Int. Cl. A23g 3/00
U.S. Cl. 99—134                    17 Claims

ABSTRACT OF THE DISCLOSURE

Gelled food products which contain starch as the congealing agent are prepared by employing, as the congealing agent, a thin-boiling, amylose-containing cereal starch having a fluidity within the range of about 30 to about 80, an amylose content not in excess of about 35%, and a fat content not in excess of 0.3%. The invention is applicable to the preparation of any food product wherein quick gelling properties are desired, and is particularly useful in the preparation of gum confections such as gumdrops, jellybeans, etc.

---

This invention relates to an improved gum confection having a starch base and to the method for making the same. More particularly the invention relates to the use therein of a thin-boiling starch having exceptionally fast congealing properties. The invention is particularly useful in gum confections or starch jellies, as they are sometimes called, such as gumdrops, gum slices, jellybeans, gum-centered candies and the like. The thin-boiling starch of this invention may also be used in foods where quick gelling properties are required, e.g., puddings, pie and other fillings, custards, toppings, icings and the like.

Starches conventionally used in making gum confections having a starch base are the thin-boiling cereal starches generally derived from corn or wheat. These starches have been modified, by acid treatment or other means, to reduce their paste viscosity and thus permit use of higher starch solids in the gum confections. Starches thus modified to give pastes having a fluidity within the range of about 30 to 80 (as measured by the method of Buel, 8th Intern. Congr. Pure Applied Chem., Orig., Comm., 13, 63 (1912)) are generally used.

In making a gum confection, it is necessary to cook the starch with water and sugars to produce a sirup which upon cooling will set up to a gel.

The procedure for making gum confections has always been time consuming. In the older processes, both the cooking and the gelling processes were prolonged. For example, in the older procedure, the starch was cooked at atmospheric pressure in a sugar solution containing excess water, and the mixture then subjected to a rolling boil until sufficient water had been lost by evaporation to give a sirup of the proper consistency. The end point was judged by the skilled candy maker by dipping a paddle into the hot sirup and observing the clarity and the manner in which the sirup drained from the paddle in a flat sheet-like form. In more modern methods for making gum confections, the requisite amounts of starch, sugar, corn sirup, and water are cooked under pressure to super-temperatures by steam injection or by use of a heat exchanger. This technique has two advantages: (1) the sirup is cooked on a continuous basis rather than by batches, (2) only the required amount of water is employed and there is no necessity to remove excess water; thus, the cooking time is reduced.

However the starch is cooked, the subsequent steps in the process have remained virtually unchanged and unimproved for many years. The cooked sirup is continuously deposited in small measured portions into depressions in a bed of dry powdered molding starch, which is contained in shallow trays. The surface of the bed of molding starch is first smoothed over, and then imprinted with depressions of the desired shape, viz., the crescent-shaped "orange slices," or the round hemispherical form of the conventional gumdrop. The trays of molding starch are carried on a continuous belt, and the hot sirup resulting from the cooking operation is automatically injected, as by a depositing hopper, into the preformed depressions. The freshly deposited gum confection is relatively soft and semi-fluid, even when cooled, and a considerable aging period is necessary for the development of desired gel structure. Consequently, as the trays of deposited confection become filled, they are stacked on movable racks and moved into a conditioning room, where they may be aged from one to several days. Several desired changes occur during this period:

(1) The deposited starch-sugar sirup gradually sets up to a firm gel.

(2) The starch-sugar sirup gradually loses water to the bed of molding starch. To facilitate this water exchange, the molding starch may be predried to approximately 5 to 8% moisture content, under which circumstance it gradually removes water from the confection, thus facilitating the development of a gel structure therein. If the temperature of the conditioning room is exceptionally high, the predrying of the molding starch is not necessary since moisture in the confection will migrate through the starch into the hot air.

(3) The surface of the gum confection gradually develops a desired structure, which should be firm enough for subsequent panning or sugaring operations and final packaging, but should not be tough or leathery. Also, the surface should be glossy and smooth.

After conditioning for the necessary period of time (usually in the range of 24 to 72 hours at temperatures from ambient to about 71° C.), the gum confections are screened from the molding starch, panned or "sanded" (i.e., given a coating of crystalline sugar), and packaged. The molding starch must then be redried to the requisite low moisture content for reuse. Other details concerning formulation and processing are given by Kerr, "Chemistry and Industry of Starch," 2nd edition, pp. 559–562 (1950).

The major disadvantages of the above conventional process are as follows:

(1) The use of a bed of molding starch, which necessitates the separation of confection from the molding starch and the redrying of the latter for reuse. Indeed, the use of molding starch is not only tedious and inconvenient, but it may likewise create an explosion hazard due to dusting.

(2) The necessity for prolonged conditioning of the gum confection represents a bottleneck in the process, slowing down production and using valuable space for conditioning rooms.

The main object of this invention is to provide an improved gum confection and process for making the same by the use of certain defatted, thin-boiling, quick-congealing starches. Another object is to provide a process for making gum confections whereby the aforementioned disadvantages are overcome. A further object is to provide novel, quick-congealing food products and processes for making the same by the use of the aforementioned starches. Other objects will appear hereinafter.

We have discovered unexpectedly that novel, quick-congealing food products may be made by the use of thin-boiling, amylose-containing cereal starches having specific properties. For convenience, we shall sometimes refer to the starch as quick-congealing starch.

The use of a quick-congealing starch, as hereinafter more fully described, avoids the disadvantages heretofore discussed. In addition, other advantages of this invention are as follows: (1) a more sanitary process, avoiding the continuous recycling of molding starch, (2) the formation of a firmer gel structure than is possible with conventional confectionery starch, or alternatively, the use of less starch to produce any desired level of gel structure, (3) the production of a gel structure more like that of the more costly but preferred fruit pectin gels, with less of the gummy or doughy consistency frequently obtained with conventional confectionery starches, (4) greater clarity and optical brilliance of the finished gum confection, particularly advantageous for sales appeal, (5) immediate formation of an ideal surface or skin on the confection, which is very glossy, resistant to cracking and to sweating of the gum confection when packaged in moisture-proof containers (e.g., glass jars) which may cause stickiness in the sugar coating and consequent adhesion between confection pieces, (6) improved flavor of the gum confection, apparently due to removal of trace materials which may contribute an undesirable "cereal" flavor, (7) elimination of the necessity for predrying the molding starch in some operations since the development of a satisfactory gel structure does not depend upon the removal of moisture from the confectionery piece by the molding starch.

The particular advantages above described are obtained by the use of thin-boiling cereal starches which have been solvent-extracted to reduce the content of fatty acid below 0.3% on dry-starch basis, and preferably below 0.15%. Some additional advantage may be realized by reducing the fat content to the vanishing point (i.e., below 0.05%), although such advantage may be offset by the cost of such extreme extraction procedures. In general, it is found that the major advantages of this invention are adequately realized with cereal starches whose fat content is in the range of 0.05–0.15%. For purposes of comparison, the fat content of corn starch (and of its thin-boiling modifications) is normally in the range of 0.60–0.65%, wheat starch contains 0.50–0.65%, and rice starch may run 0.6–0.8%. Defatting may be accomplished by any of the various known processes, including hot or cold elution with solvent, and the methods described in U.S. Patents 2,587,650 and 2,280,723.

Suitable starches for the invention include those which are normally used for gum confections, namely, thin-boiling corn, sorghum and wheat starches, modified to the 30–80 fluidity level as by acid or other known means. Comparable thin-boiling starches from other cereal sources (e.g., rice, barley) may be used where economically feasible. However, the waxy or amylopectin starches are useless in gum confections of the described type, since the absence of an amylose component prevents the development of a gel structure. Similarly, most root starches (e.g., potato, tapioca) are inapplicable in gum confections, since for some obscure reason they do not give firm gels, despite the presence of an amylose component. High-amylose starches (i.e., from high-amylose corn or wrinkled-seeded peas) and amylose fractions separated from starches which have been cooked into a dispersed or soluble state under special high-temperature procedures may be used in the present invention. Blends of the various starches mentioned above may be used also.

The starch may be acid-modified or modified by other known means to the conventional level for a confectioner's starch and then defatted, or the unmodified starch may be defatted and subsequently modified to the desired fluidity level, an essential feature being the removal of the fat to the desired level. Generally, no significant differences can be observed in the final product, provided the degree of modification is at the same level, and provided the fatty acid content is reduced to the same low level (i.e., below 0.3% and preferably below 0.15%).

Obviously, the starch used in the present invention must be of a type normally used for gum confections and the like, that is, an amylose-containing cereal starch having a fluidity within the range of about 30 to 80. The important features of this invention are the use of starches having a fluidity of about 30 to 80 and their fat content reduced below 0.3% and preferably below 0.15%. The fat content therefore represents one criterion by which the accomplishment of this invention is judged. For this purpose, the total fat-after-hydralysis is determined by the method published in "Methods in Carbohydrate Chemistry," edited by R. L. Whistler, vol. 4, pp. 59–60 (1964). One modification has been made on this published method, in that the final extraction of fatty acid from the hydrolyzed sludge is accomplished with carbon tetrachloride rather than naphtha. This is merely a safety precaution, and identical results are obtained with either solvent. With high-amylose starches (i.e., high-amylose corn starch, wrinkled pea starch), the acid hydrolysis step should be run for 4 hours, rather than the 2 hours specified in the foregoing published procedure. All fat contents herein reported are calculated to dry-basis starch, running separate moisture determinations for 4 hours at 120° C. in the vacuum oven.

For the manufacture of gum confections, the mixture of starch, sugar (and/or corn sirup) and water may be cooked by either the older batch process or by more modern techniques of continuous high-temperature cooking. In either case, the special benefits of a defatted starch are realized, to a degree dependent on the extent of defatting of the starch. If the fat content is in the range of 0.05–0.09%, the confection cast into molds sets up to a satisfactory gel within 10 minutes. Generally, defatted thin-boiling starches containing 0.3% fat gave a satisfactory gel structure within 5 hours. In contrast, starches inadequately defatted (with fat contents of 0.4% and 0.5%, and consequently outside the purviews of this invention) showed no significant difference from the unextracted starch, and required similar prolonged curing in the conditioning room to effect a satisfactory gel structure. For purposes of this invention, it is considered that satisfactory gel structure has been attained when the gum confection can be unmolded, sugared and packaged, without deformation due to excessive plastic flow.

The manner of molding the hot cooked sirup made with the defatted thin-boiling starches of the present invention will depend on the facilities and equipment available to the confectioner. The following procedures are suggestive only and do not in any sense restrict the mode of application of these improved defatted confectionery starches:

(1) A conventional bed of molding starch may be employed, whereby the hot sirup is cast into preformed depressions. The cast confection is allowed to cool, e.g., for a period of 10 minutes to 5 hours, to allow the formation of a satisfactory gel structure (the time here being dependent not only on the extent of defatting of the starch, but also on the starch content of the formulation), then unmolded, the adhering molding starch removed by the usual procedures of brushing, and the confection panned or sanded (i.e., sugared) and packaged. The molding starch as here employed merely serves as a convenient medium for forming and cooling the confection pieces, and no prolonged conditioning is required to set up a satisfactory gel structure. As already mentioned, it is not necessary to predry the molding starch to a low moisture level to obtain a satisfactory gel structure.

(2) The hot cooked sirup may be injected into depressions in a stainless steel belt or in stainless steel plates. To assist unmolding, the metal sheet may be coated with a plastic such as that sold under the trademark "Teflon" or other known release agents. Alternatively, a rubber or suitable plastic belt may be used, with the desired impressions imprinted therein. A bed of molding starch with suitable impressions on a continuous belt may also be used. This procedure permits a continuous process, whereby the cast confection is cooled in an air stream to facilitate the set-up of a satisfactory gel structure. At the end of a relatively short period for congelation, the confectionery pieces are unmolded, sugared and packaged. In such a process, there is no substantial reduction of moisture in the finished confection, and the formation of a satisfactory gel structure is due entirely to congelation during cooling of the hot sirup.

(3) By slightly increasing the percentage of starch in the original formulation, it is possible to form the gum confection piece by a pressure-extrusion process, whereby the hot plastic product is forced through a suitable die and continuously cut into appropriate pieces, which are then dropped onto a movable belt and rapidly cooled, as, for example, in a stream of air. In such cases, congelation sets in so rapidly that deformation by plastic flow does not occur. Also, the hot sirup may be partially congealed and then extruded. Still another method of making the confection involves cooking the slurry containing the starch and the sugar in a temperature controlled zone of an extruder and thereafter treating the host plastic product as described above.

The processes, results and benefits of this invention will be further elucidated by the following examples which are intended to be illustrative only and in no way limiting the invention.

EXAMPLE I

The following formulations were prepared, using an ordinary 67-fluidity corn starch as control (fat content= 0.6%) and a solvent-defatted starch prepared therefrom (fat content=0.06%):

|  | A | B | C | D |
|---|---|---|---|---|
| Regular 67-fluidity starch, lb | 1.0 | | | |
| Defatted 67-fluidity starch, lb | | 1.0 | 0.9 | 0.8 |
| Water, lb | 1.25 | 1.25 | 1.25 | 1.25 |
| Sucrose, lb | 2.4 | 2.4 | 2.4 | 2.4 |
| Corn sirup, 43° Bé., 66 D.E., lb | 5.6 | 5.6 | 5.6 | 5.6 |

The resulting slurries were preheated to boiling (106–108° C.) and then pumped through a steam injection cooker accurately controlled to give a temperature of 129–135° C. Cooking time at this temperature was 26–28 seconds. Identical amounts of citric acid, lemon flavor and yellow food color were then added to each batch. Refractometer readings on the hot sirups indicated actual solids contents in the range of 77–79%. The sirups were then deposited in conventional molding starch beds. Batch A (containing regular non-defatted 67-fluidity gumdrop starch) required 42 hours in the hot conditioning room before the confection pieces could be removed from the starch mold and sugar-sanded. Within 10 minutes after depositing batches B, C and D (containing the same 67-fluidity confectionery starch, but defatted to 0.06% fat content), the gumdrops had attained sufficient gel structure to permit removal and sugaring without further holding time, despite the fact that the gumdrops were still too hot to touch. Indeed, when the temperature of the cooked sirup dropped below about 82 to 87° C., the confection tended to set up to a pectin-like gel; when the temperature was raised above about 82 to 87° C., this gel reliquefied to its former consistency.

As a rigorous test of storage properties, portions of the gumdrops from each batch were held at room temperature for 24 hours, then sugar-sanded, and stored in sealed glass jars for 12 days at about 43° C. Only batch A (containing non-defatted starch) showed evidence of moisture-sweating and stickiness. Physical appraisals of the four batches of gumdrops after 12 days were as follows:

Batch A: Normal body and gel structure, smooth but slightly stringy texture. Fairly good storage stability.

Batch B: Body is much firmer and harder than batch A, with a structure similar to a pectin gel. Excellent storage stability.

Batch C: Body is somewhat firmer than batch A. Sugar coating is superior to any of the samples tested. Excellent storage stability.

Batch D: Body and texture comparable with batch A, but more pectin-like in structure. Excellent storage stability.

Thus, in addition to a very rapid congelation, it is apparent that the defatted starch is more efficient as a gel-producer, since equivalent body of the finished gumdrops can be realized with only 0.8 lb. of the defatted starch, as compared with 1.0 lb. of the normal non-defatted starch.

EXAMPLE II

The following formulation was employed in making gum confections using defatted corn starch having a fat content of 0.10% and a 45-fluidity:

| | |
|---|---|
| Corn sirup | 1 pound, 0 ounce. |
| Sucrose | 1 pound, 1.5 ounces. |
| Starch | 4 pounds, 9 ounces. |
| Water | 3 pounds, 0 ounce. |

The above mixture was preheated to approximately 108° C. and then pumped through a steam injection cooker under internal temperature conditions of about 129° C. The hot mixture was then transferred into starch molds and allowed to set at room temperature. The mixture began to set up after 30 minutes and was removed from the mold after 45 to 60 minutes. The resulting gum confection had a firm gel structure similar to those obtained in Example I.

EXAMPLE III

A defatted corn starch having a fat content of 0.07% and a fluidity of 69 was substituted for the starch in Example II. After the mixture was cooked as described therein, the resultant hot sirup was transferred to an extruding device. This was a hand-operated cylindrical extruding device and consisted of a metal cylinder fitted with a plunger and an orifice one-fourth inch in diameter. The hot sirup was transferred to the cylinder of the device and cooled to a temperature of approximately 38° C. over a period of 30 minutes and extruded, cut into various size pieces which were rolled in sanding sugar. These pieces had similar properties to those described in the previous examples.

EXAMPLE IV

A defatted grain sorghum starch having a fat content of 0.2% and a 45-fluidity was substituted for the starch in Example II. The mixture after being transferred to the molds began to set up after 30 minutes and was removed from the molds after 35 to 60 minutes. The resulting gum confection had a firm gel structure similar to those obtained in the previous examples.

EXAMPLE V

A defatted rice starch having a fat content of 0.2% and a fluidity of 60 was substituted for the starch in Example II. The mixture began to set up after 30 minutes and was removed from the molds after 60 minutes. The resulting gum confection had a satisfactory firm gel structure similar to those above described.

EXAMPLE VI

A defatted corn starch having a fat content of 0.25% and a fluidity of 63 was substituted for the starch in Example II. The mixture began to set up after 30 minutes and was removed from the mold after 45 to 60 minutes. The resulting gum confection had a satisfactory firm gel structure similar to those above described.

EXAMPLE VII

A corn starch having a fat content of 0.4% and a fluidity of 63 was substituted for the starch in Example II. The mixture required about 24 hours to set up to a gel and behaved generally the same as thin-boiling starches presently used in gum confections.

We claim:

1. A gelled food product which contains a flavoring agent, and a sweetening agent and which furthermore contains starch as the congealing agent therefor, wherein said congealing agent comprises a thin-boiling, amylose-containing cereal starch having a fluidity within the range of about 30 to about 80, an amylose content not in excess of about 35% by weight, and a fat content not in excess of 0.3% by weight.

2. Product according to claim 1 wherein the starch is corn starch.

3. Product according to claim 1 wherein the starch is sorghum starch.

4. Product according to claim 1 wherein the starch is rice starch.

5. A confection of the gum type which contains, as the congealing agent, thin-boiling, amylose-containing defatted cereal starch having a fluidity within the range of about 30 to 80, an amylose content not in excess of about 35% by weight, and a fat content not in excess of 0.3% by weight.

6. Process for making gum confections which comprises cooking a thin-boiling, amylose-containing defatted cereal starch having a fluidity within the range of about 30 to 80, an amylose content not in excess of about 35% by weight, and a fat content not in excess of 0.3% by weight, with a sweetener and depositing the resultant cooked sirup in a mold and allowing it to gel.

7. Processs according to claim 6 wherein the mold consists of a continuous belt containing depressions of a predetermined form.

8. Process according to claim 6 wherein the resultant cooked sirup is cooled and extruded under pressure and cut into desired forms.

9. Process for making gelled food product which contains starch as the congealing agent therefor, which comprises cooking with an aqueous liquid a thin-boiling, amylose-containing defatted cereal starch having a fluidity within the range of about 30 to 80, an amylose content not in excess of about 35% by weight, and a fat content not in excess of 0.3% by weight, and allowing the cooked product to gel., a flavoring substance and a sweetening substance being incorporated prior to cooling.

10. Process according to claim 9 wherein the starch is corn starch.

11. Process according to claim 9 wherein the starch is sorghum starch.

12. Process according to claim 9 wherein the starch is rice starch.

13. A confection in accordance with claim 5 wherein said cereal starch is a member selected from the group consisting of corn starch, sorghum starch and rice starch.

14. The process in accordance with claim 6 wherein said cereal starch is a member selected from the group consisting of corn starch, sorghum starch and rice starch.

15. A gelled food product having a flavoring agent, and a sweetening agent and furthermore a starch congealing agent wherein said congealing agent consists essentially of a defatted, thin-boiling cereal starch that has a fluidity in the range from about 30 to about 80, an amylose content not above about 35% by weight, and a residual fat content not in excess of about 0.3% by weight.

16. A food product in accordance with claim 15, in the form of a gum confection.

17. A gum confection in accordance with claim 16, wherein the cereal starch is corn starch.

References Cited

UNITED STATES PATENTS

| | | | |
|---|---|---|---|
| 1,475,579 | 11/1923 | Harlan | 99—180 |
| 3,218,177 | 11/1965 | Robinson et al. | 99—134 |
| 3,265,510 | 8/1966 | Wurzburg et al. | 99—134 |

A. LOUIS MONACELL, *Primary Examiner.*

WILLIAM C. LAWTON, *Assistant Examiner.*

U.S. Cl. X.R.

99—129, 139; 127—32, 33

PO-1050
(5/69)

UNITED STATES PATENT OFFICE
CERTIFICATE OF CORRECTION

Patent No. __3,446,628__  Dated __May 27, 1969__

Inventor(s) __Thomas J. Schoch, Donald F. Stella and Howard J. Wolfmeyer__

It is certified that error appears in the above-identified patent and that said Letters Patent are hereby corrected as shown below:

Column 4, line 20 "fat-after-hydralysis" should read "fat-after-hydrolysis";

Column 5, line 32 "host" should read "hot";

Example II, lines 29-30-31 and 32;

> Corn sirup "1 pound, 0 ounce" should be "4 pounds, 9 ounces";
> Sucrose "1 pound, 1.5 ounces" should be "3 pounds, 0 ounce";
> Starch "4 pounds, 9 ounces" should be "1 pound, 0 ounce";
> Water "3 pounds, 0 ounce" should be "1 pound, 1.5 ounces".

SIGNED AND
SEALED
MAR 17 1970

(SEAL)
Attest:

Edward M. Fletcher, Jr.
Attesting Officer

WILLIAM E. SCHUYLER, JR.
Commissioner of Patents